United States Patent
Lee et al.

(10) Patent No.: US 9,911,160 B2
(45) Date of Patent: Mar. 6, 2018

(54) TAX PAYMENT SYSTEM AND METHOD FOR ACCURATE PAYMENTS

(71) Applicants: John H. Lee, Olathe, KS (US); Richard A. Lee, Olathe, KS (US)

(72) Inventors: John H. Lee, Olathe, KS (US); Richard A. Lee, Olathe, KS (US)

(73) Assignee: Rigel Technology Corporation, Olathe, KS (US)

( * ) Notice: Subject to any disclaimer, the term of this patent is extended or adjusted under 35 U.S.C. 154(b) by 126 days.

(21) Appl. No.: 14/735,133

(22) Filed: Jun. 10, 2015

(65) Prior Publication Data

US 2016/0364806 A1    Dec. 15, 2016

(51) Int. Cl.
 *G06Q 40/00* (2012.01)
 *G06Q 50/26* (2012.01)

(52) U.S. Cl.
 CPC .................................... *G06Q 40/10* (2013.01)

(58) Field of Classification Search
 CPC ......... G06Q 30/06; G06Q 10/00; G06Q 40/00
 See application file for complete search history.

(56) References Cited

U.S. PATENT DOCUMENTS

| | | | |
|---|---|---|---|
| 4,324,975 A | 4/1982 | Rees | |
| 6,993,502 B1 | 1/2006 | Gryglewicz et al. | |
| 7,539,635 B1 * | 5/2009 | Peak | G06Q 10/00 705/31 |
| 7,966,231 B2 | 6/2011 | Foster | |
| 8,082,144 B1 | 12/2011 | Brown et al. | |
| 8,099,329 B2 | 1/2012 | Paulsen et al. | |
| 8,099,342 B1 | 1/2012 | Christian et al. | |
| 8,165,936 B2 | 4/2012 | Chen | |
| 8,612,318 B1 | 12/2013 | Blowers | |
| 8,682,766 B1 | 3/2014 | Blowers | |
| 8,788,412 B1 | 7/2014 | Hamm | |
| 9,330,415 B1 * | 5/2016 | Castleman | G06Q 40/00 |
| 2005/0209939 A1 * | 9/2005 | Joseph | G06Q 30/06 705/31 |

OTHER PUBLICATIONS www.irs.gov.
www.worldwide-tax.com.

* cited by examiner

*Primary Examiner* — Talia F Crawley
(74) *Attorney, Agent, or Firm* — Hissan Anis

(57) ABSTRACT

The present invention provides a tax payment system and method for accurate payments, which transfer accurate withholding tax payments from taxpayers to governments and accurate payroll payments from employers to employees with accurate employee information. Current Tax Schedules, Tax Tables and Tax Computation Worksheet are combined together for their simplification with related linear and graduate formulas. Accurate information of income tax payments, withholding tax payments and employees or businesses can be reported to the IRS or a state government by January 15 or February 15 with adjustments. Then governments can be ready to verify and/or inspect tax returns before sending out tax refunds. Therefore potential tax theft crimes could be reduced significantly or avoided to save billions of dollars. The tax payment system and method offer many taxpayers with a one-source income and certain qualifications to have an option to not file their tax returns because of accurate withholding tax payments, which reduce tax processing time and costs for governments and taxpayers significantly, which may be worth billions of dollars yearly.

1 Claim, No Drawings

TAX PAYMENT SYSTEM AND METHOD FOR ACCURATE PAYMENTS

FIELD OF THE INVENTION

The present invention provides a tax payment system and method for accurate payments of withholding tax payments from taxpayers to governments and payroll payments from employers to employees. Employee or business information is received to figure out income tax rate and tax with linear and gradual (LG) formulas. Accurate tax payments are transferred to governments and payroll payments are transferred to employees according to accurate employee information and governmental regulations. Employee and tax information can be reported to the Internal Revenue Service (IRS) by January 15 or February with adjustments, which is used for verification or inspection before tax refunds are sent out for reducing and/or avoiding tax theft crimes. The tax payment system and method for accurate payments offer employees with a one-source income and non-complex tax situations may have the option to not file tax returns, which can save billions of dollars.

BACKGROUND OF THE INVENTION

Current U.S. federal personal income tax systems have two different sets of Tax Rate Schedules (including related tables) and Tax Table/Tax Computation Worksheet. Tax Rate Schedules are used to estimate income taxes. Tax Table and Tax Computation Worksheet are used to figure out accurate tax payments. Tax Table is usually 12-pages long. For example, the 2014 Tax Rate Schedules with the 7 tax brackets and tax rate ranges from 15% to 39.6%, which were published in late 2013, were used for employers to estimate employees' income taxes and withholding taxes for 2014. 2014 Tax Table and Tax Computation Worksheet, which were published in early 2015, were used for employees to calculate their accurate taxes for filing tax returns by Apr. 15, 2015.

Based on Tax Rate Schedules, employers estimate income taxes, transfer withholding taxes (including income, social security and Medicare taxes) to the IRS and report Form W-2 with employees' social security wages, paid federal and state taxes to the IRS by Mar. 15, 2014 Tax Rate Schedules (partial) are shown in Table 1, which are slightly changed from 2013 Tax Rate Schedules (partial) in Table 2. For example, the second taxable income range is changed slightly from 17,850-72,500 to 18,150-73,800. The IRS does not know employee information or is not capable of verifying or inspecting how much taxes employees should pay from the W-2. All employees need to correct employers' tax estimations with tax returns based on Tax Table and Tax Computation Worksheet. The Tax Table (partial 2013), which has 12 pages, is shown in Table 3. The IRS cannot compare because of having no detailed individual tax data. Then the IRS has no enough time to verify or inspect before sending tax refunds within a limited time of receiving tax returns, which gives tax criminals a chance for possible tax theft crimes.

TABLE 1

Partial 2014 Federal Personal Tax Rate Schedules (7 tax brackets)

| Taxable income (TI) | | | | |
|---|---|---|---|---|
| Over | Not over | Tax is | The Amount is over | Tax Estimation |
| Schedule Y 1 - Married Filing Jointly or Qualifying Widow(er) | | | | |
| 0-18,150 | | 10% | | 0.1 * TI |
| 18,150-73,800 | | 1,815 + 15% | 18,150 | 1,815 + 0.15 (TI-18,150) |
| 226,850-405,100 | | 50,765.00 + 33% | 226,850 | 50,765.00 + 0.33 (TI-226,850) |
| 405,100-457,600 | | 109,587.50 + 35% | 405,100 | 109,587.50 + 0.35 (TI-405,100) |
| 457,600 | | 127,962.50 + 39.6% | 457,600 | 127,962.50 + 0.396 (TI-457,600) |
| Schedule Z - Head of Household | | | | |
| 0-12,950 | | 10% | | 0.1 * TI |
| 12,950-49,400 | | 1,295.00 + 15% | 12,950 | 12,950 + 0.15 (TI-12,950) |
| 405,100-432,200 | | 113,939 + 35% | 405,100 | 113,939 + 0.35 (TI-405,100) |
| 432,200 | | 123.424 + 39.6% | 432,200 | 123.200 + 0.396 (TI-432,200) |
| Schedule X - Single | | | | |
| 0-9,075 | | 10% | | 0.1 * TI |
| 405,100-406,750 | | 117,541.25 + 35% | 405,100 | 117,541.25 + 0.35 (TI-405,100) |
| 406,750 | | 118,118.75 + 39.6% | 406,750 | 118,118.75 + 0.396 (TI-406,750) |
| Schedule Y 2 - Married Filing Separately | | | | |
| 0-9,075 | | 10% | | 0.1 * TI |
| 202,550-228,800 | | 54,793.75 + 35% | 202,550 | 54,793.75 + 0.35 (TI-202,550) |
| 228,800 | | 63,981.25 + 39.6% | 228,800 | 63.981.25 + 0.396 (TI-228,800) |

TABLE 2

Partial 2013 Federal Personal Tax Rate Schedules (7 tax brackets)

Taxable income (TI)

| Over | Not over | Tax is | The Amount is over | Tax Estimation |
|---|---|---|---|---|
| Schedule Y 1 - Married Filing Jointly or Qualifying Widow(er) | | | | |
| 0 | 17,850 | 10% | | 0.1 * TI |
| 17,850 | 72,500 | 1,785 + 15% | 17,850 | 1,785 + 0.15 (TI-17,800) |
| 223,050 | 398,350 | 49,919.50 + 33% | 223,050 | 49,919.50 + 0.33 (TI-223,050) |
| 398,350 | 450,000 | 107,768.50 + 35% | 398,350 | 107,768.50 + 0.35 (TI-398,350) |
| 450,000 | | 125,846.00 + 9.6% | 450,000 | 125,846.00 + 0.396 (TI-450,000) |
| Schedule Z - Head of Household | | | | |
| 0 | 12,750 | 10% | | 0.1 * TI |
| 12,750 | 48,600 | 1,275.00 + 15% | 12,750 | 12,750 + 0.15 (TI-12,750) |
| 398,350 | 425,000 | 112,037 + 35% | 398,350 | 112,037 + 0.35 (TI-398,350) |
| 425,000 | | 121.364.50 + 39.6 | 425,000 | 121.364.5 + 0.396 (TI-425,000) |
| Schedule X - Single | | | | |
| 0 | 8,925 | 10% | | 0.1 * TI |
| 398,350 | 400,000 | 115,586.25 + 35% | 398,350 | 115,586.25 + 0.35 (TI-398,350) |
| 400,000 | | 116,163.75 + 39.6% | 400,000 | 116,163.75 + 0.396 (TI-400000) |
| Schedule Y 2 - Married Filing Separately | | | | |
| 0 | 8,925 | 10% | | 0.1 * TI |
| 199,175 | 225,000 | 53,844.25 + 35% | 199,175 | 53,844.25 + 0.35 (TI-199,175) |
| 225,000 | | 62,923 + 39.6% | 225,000 | 62.923 + 0.396 (TI-225,000) |

TABLE 3

Partial 2013 Federal Tax Table (12 pages)

| Taxable income (TI) | | 2013 Tax | | | |
|---|---|---|---|---|---|
| Over | Not over | Y-1 | Z | X | Y-2 |
| 0 | 5 | 0 | 0 | 0 | 0 |
| 5 | 15 | 1 | 1 | 1 | 1 |
| 50 | 75 | 6 | 6 | 6 | 6 |
| 1,000 | 1,025 | 101 | 101 | 101 | 101 |
| 8,900 | 8,950 | 893 | 893 | 893 | 893 |
| 10000 | 10050 | 1003 | 1003 | 1058 | 1058 |
| 50000 | 50050 | 6611 | 7009 | 8435 | 8435 |
| 99950 | 100000 | 16851 | 19496 | 21286 | 21726 |

The two different tax sets of early tax estimations from Tax Rate Schedules and later accurate tax returns from Tax Table and Tax Computation Worksheet have tax rate differences, which require all employees to file tax returns to correct early tax estimations for accurate tax returns. Therefore taxpayers and the federal government spend significant time and costs. Many state governments have similar tax systems as the federal tax system. Hawaii's personal tax system has 12 tax brackets (1.4%-11%) and 3 tax filing statuses (Tax Table and Schedules I, II and III), which is the most complex personal tax system in all U.S. state personal tax systems. California personal tax system is relatively complex with 10 tax brackets (1.1%, 2.2%, 4.4%, 6.6%, 8.8%, 10.23%, 11.33%, 12.43%, 13.53% and 14.63%) and 5(3) tax filing statuses. Some states use flat tax rates, which are too simple and not reasonable to different incomes. Tax systems in the U.S. and many states, which include taxable income ranges, tax numbers in Tax Table and tax brackets, have been changed yearly or frequently. There were 7 tax brackets in 2013, 2014 and 2015, 6 tax brackets during 2010-2012, 16 tax brackets in 1980 and 25 tax brackets in 1970 in the U.S. federal tax systems. These differences and changes make our tax systems to be more complex. Many other countries have similar issues and challenges.

Under current federal and state tax systems, a single tax formula of tax=h+m(TI−n) or mTI−(mn−h) is used, where h, m and n are constants and TI is taxable income. When h and n are 0, the formula is tax=mTI, in which m may be 0.1. More tax brackets mean smoother tax rate changes while less tax brackets mean unsmooth tax rate changes. Smooth tax rate changes require more tax brackets with more tax processing time and costs. Current Tax Schedules are used to estimate income withholding taxes. Then exact income taxes are calculated by Tax Table and Tax Computation Worksheet. Current Tax Schedules in the U.S. and many state tax systems cannot be used to withhold accurate income withholding taxes because of the estimations. Besides in USA, many other countries also use tax=h+m (TI−n) format with multi tax brackets for income tax systems. Over the years, various attempts have been made to develop tax methods, systems and products based on current tax systems. U.S. Pat. No. 8,788,412 discloses a system and method for processing transaction and tax data, verifying tax calculations/determinations, reconciling calculation/determination errors, and filing and/or paying taxes. U.S. Pat. No. 8,682,766 discloses a method for providing a set of automated financial services to a set of clients. The set of automated financial services include payroll processing, trust fund management, investment of funds and ACH transactions processing. U.S. Pat. No. 8,612,318 discloses a method and system for payroll tax settlement that receives payroll tax files from a payroll provider system. U.S. Pat. No. 8,165,936 discloses a payroll system and method for generating, accumulating and reporting on payroll information. U.S. Pat. No. 8,099,342 discloses the methods, apparatus, and articles of manufacture for tax computation, management, and compliance reporting via a centralized transactional tax platform. U.S. Pat. No. 8,099,329 discloses the systems and methods for determining taxes owed for financial transactions conducted over a network. U.S. Pat. No. 8,082,144 discloses a tax calculation explanation generator. U.S. Pat. No. 7,966,231 discloses a method and system for determining taxes attributable to a financial transaction to create a tax rate table. U.S. Pat. No. 7,539,635 discloses a system and method for generating personalized tax device documents. U.S. Pat. No. 6,993,502 discloses a system and method for computing and collecting taxes, which has applications for determining taxes for transactions conducted over the Internet. U.S. Pat. No. 4,324,975 discloses a hand-held calculating device for calculating Federal Income Taxes or the like includes substantially flat, elongate front and rear cover members and an insert card.

Current U.S. state personal tax systems are usually simpler than the federal personal tax systems. Some states use flat tax rates and some states use up to 9-12 tax brackets in state personal tax systems. A flat tax rate is too simple, which makes it difficult to cover both low and high or different taxable incomes reasonably. Tax systems with more tax brackets (such as 6-25) are too complex, which requires more time and costs. The best is to make simplicity and fairness or avoid complexity and unfairness together with 2-5 (preferred 2-4) tax brackets for national and state personal and corporate tax systems, which provides convenience to develop tax systems, methods and products.

More and more people and governmental officers would like governments, employers and employees to spend less tax processing time and costs with a simple and fair tax system. To increase tax processing efficiency and reduce related time and costs are very important. A flat tax rate is good for sale tax rate, which is operated easily. For individuals and corporations, their taxable incomes are different. One or several flat tax rates are extremely difficult to cover different taxable incomes and situations reasonably and simply. The current U.S. federal and many states often have 5 to 12-page Tax Tables, which are too complex. Individuals and corporations with different taxable incomes should relate to reasonable low-to-high tax rates. The simplification of the current tax systems with fair tax rates has been a hot topic for many years.

SUMMARY OF THE INVENTION

This invention discloses a tax payment system and method for accurate payments. Employee information of name, social security number, address, tax filing status, social security wage (or wage), exemptions, deductions and credits are received. Income tax rate and tax are figured out according to related linear or graduate formula from related taxable income and federal/state governmental tax regulations. Approaching tax rates are found according to related payroll period factor and actual employee information for accurate tax payments. Then accurate tax payments and withholding taxes are transferred from taxpayers to federal and state governments and accurate payroll payments are transferred from employers to employees.

The U.S. and many other countries use the format of tax=h+m(TI−n) and multi tax brackets for their income tax systems. We have developed a new linear and gradual (LG) tax rate system. Its purpose is to have smoother tax rate changes and less tax brackets for personal and corporate tax systems. Both linear tax rate formula (tax rate=a+TI/b) and gradual tax rate formula (tax rate=c−d/TI) are used to simplify and combine complex federal Tax Rate Schedules, Tax Table (12 pages) and Tax Computation Worksheet together, where a, b, c and d are constants. In y=a+TI/b, tax rates (y) against taxable incomes (TI) change smoothly at a constant slope 1/b, which is not related to taxable incomes and is more reasonable. In y=c−d/TI, tax rate slopes relate to taxable incomes and always change at $d/TI^2$ (not constant). y=c−d/TI is used in current federal and many tax systems. Table 4 shows the LG tax rate system for 2014 federal tax rates, in which taxable ranges and LG formulas are simple and can be easily modified. A tax rate range check is used for checking calculations to reduce or avoid calculation mistakes. Payroll period factor (F) is used for figuring withholding and payroll payments, which is shown in Table 5. Table 4 may be used automatically or manually. The current 7 tax brackets in the federal tax system (2014) are reduced to 4 (43% reduction) reasonably.

TABLE 4

LG tax system for 2014 tax rates

| Filing Status | Taxable Income(TI) Over | Not over | Your TI | LG tax rate formula | Tax rate | Tax rate range check | Your Tax |
|---|---|---|---|---|---|---|---|
| Y1/1 | 0 | 100,000 | | 0.1 + TI * F/1,490,313 | | 0.1-0.1671 | |
| Y1/2 | 100,000 | 250,000 | | 0.1228 + TI * F/2,255,639 | | 0.1671-0.2336 | |
| Y1/3 | 250,000 | 450,000 | | 0.3346 − 25,256.3/TI * F | | 0.2336-0.2785 | |
| Y1/4 | 450,000 | | | 0.396 − 52,875/TI * F | | 0.2785-0.396 | |
| Z/1 | 0 | 100,000 | | 0.1 + TI * F/1,062,699.3 | | 0.1-0.1941 | |
| Z/2 | 100,000 | 250,000 | | 0.1562 + TI * F/2,636,203.9 | | 0.1941-0.251 | |
| Z/3 | 250,000 | 450,000 | | 0.3383 − 21,881.3/TI * F | | 0.251-0.2899 | |
| Z/4 | 450,000 | | | 0.396 − 47,745/TI * F | | 0.2899-0.396 | |
| X/1 | 0 | 75,000 | | 0.1 + TI * F/791,139.2 | | 0.1-0.1948 | |
| X/2 | 75,000 | 200,000 | | 0.1621 + TI * F/2,293,578 | | 0.1948-0.2493 | |
| X/3 | 200,000 | 400,000 | | 0.3299 − 16,120/TI * F | | 0.2493-0.2896 | |
| X/4 | 400,000 | | | 0.396 − 42,560/TI * F | | 0.2896-0.396 | |
| Y2/1 | 0 | 50,000 | | 0.1 + TI * F/745,156.5 | | 0.1-0.1671 | |
| Y2/2 | 50,000 | 125,000 | | 0.1228 + TI * F/1,127,819.5 | | 0.1671-0.2336 | |
| Y2/3 | 125,000 | 225,000 | | 0.3346 − 12,628/TI * F | | 0.2336-0.2785 | |
| Y2/4 | 225,000 | | | 0.396 − 26,437.5/TI * F | | 0.2785-0.396 | |

Y1: Married filing jointly or Qualifying widow(er);
Z: Head of Household;
X: Single and
Y2: Married filing separately

TABLE 5

Common payroll period factor (F)

| Weekly | Bi-Weekly | Semi-monthly | Monthly | Quaterly | Semi-yearly | Yearly |
|---|---|---|---|---|---|---|
| 52 | 26 | 24 | 12 | 4 | 2 | 1 |

The LG tax rate system can be used for replacing federal tax systems in any year with matched or minor tax rate differences. Table 6 shows tax rate differences between 2013 federal personal (Single) and LG tax systems to covers tax rates from 10% to 39.6% and taxable incomes from $1,000 to $10,000,000 with very minor differences. When taxable incomes are less than $1,000, the LG tax system has significantly better results. The current federal personal tax system shows tax rates of 19.6% at TI $5.1 or 12.0% at $50.1 from the federal Tax Table. These current tax rates for less than $1,000 (TI) from the federal Tax Table are unreasonable.

TABLE 6

Comparison between current federal and LG tax rates for Single

| Taxable income | Current tax rates | LG tax rates | Tax rate difference |
|---|---|---|---|
| 5.1 | 19.61% | 10.00% | −9.61% |
| 50.1 | 12.00% | 10.01% | −1.99% |
| 1,001 | 10.09% | 10.13% | 0.04% |
| 20,000 | 12.75% | 12.56% | −0.19% |
| 70,000 | 19.18% | 18.96% | −0.22% |
| 100,000 | 21.29% | 20.70% | −0.59% |
| 200,000 | 25.07% | 25.10% | 0.03% |
| 400,000 | 29.04% | 29.00% | −0.04% |
| 1,000,000 | 35.38% | 35.36% | −0.02% |
| 5,000,000 | 38.76% | 38.75% | 0.00% |
| 10,000,000 | 39.18% | 39.18% | 0.00% |

When a social security wage, tax filing status, exemptions, standard deductions (or personal deductions), related credits such as child tax credit are received or inputted, a tax rate and tax payment at periods such as a bi-weekly or monthly basis are calculated automatically. Standard deductions and credits are simple, which are suggested to be used by employers. Personal deductions and credits are complex, which may be used for adjustments by employees with supported documents. Withholding tax payments, which include social security, Medicare and income taxes, are transferred from taxpayers (employers and/or employees) to the federal government. Security and Medicare tax rates are fixed at flat tax rates (2×6.2% and 2×1.45%) from both employers and employees, which are simple. Payroll payments are calculated after deducting income tax payments and related deductions and credits from incomes at periods such as a bi-weekly or monthly basis. For a yearly basis, all incomes, which include salary raise, bonus and others, are used to calculate accurate income taxes according to accurate employee information, so accurate withholding tax payments are transferred from taxpayers to governments and accurate payroll payments are transferred from employers to employees.

Similar to individual personal tax systems, many corporate tax systems have multi tax brackets because flat tax rates are too simple to cover different taxable incomes. Comparing with personal tax systems, corporate tax systems are usually simpler. The federal corporate tax system has 8 tax brackets. Arkansas' corporate tax system has 6 tax brackets. Alaska's corporate tax system has 10 tax brackets from 1% to 9.4% in increments of $10,000 of taxable income, which are shown in Table 7. Many states require corporations to estimate withholding taxes at first. Then Tax Tables and Tax Computations are used to correct tax estimations and figure out accurate taxes by filing their tax returns. For example Arkansas' corporate tax system requires Arkansas' corporations to file tax estimations at first. Then the Tax Table and tax computation are used to help corporations to correct prior estimations and calculate accurate taxes for filling tax returns. It requires all businesses or corporations whether low or high taxable incomes and simple or complex tax situations to file tax returns.

TABLE 7

Alaska Corporate Tax Rate Table

| Taxable Income (TI) | | Tax Amount | Plus | Of the Amount Over | Tax Computation |
|---|---|---|---|---|---|
| At Least | But Less Than | | | | |
| -0- | 10,000 | -0- | 1% | -0- | 0.01 × TI |
| 10,000 | 20,000 | 100 | 2% | 10,000 | 100 + 0.02 × (TI-10,000) |
| 20,000 | 30,000 | 300 | 3% | 20,000 | 300 + 0.03 × (TI-20,000) |
| 30,000 | 40,000 | 600 | 4% | 30,000 | 600 + 0.04 × (TI-30,000) |
| 40,000 | 50,000 | 1,000 | 5% | 40,000 | 1,000 + 0.05 × (TI-40,000) |
| 50,000 | 60,000 | 1,500 | 6% | 50,000 | 1,500 + 0.06 × (TI-50,000) |
| 60,000 | 70,000 | 2,100 | 7% | 60,000 | 2,100 + 0.07 × (TI-60,000) |
| 70,000 | 80,000 | 2,800 | 8% | 70,000 | 2,800 + 0.08 × (TI-70,000) |
| 80,000 | 90,000 | 3,600 | 9% | 80,000 | 3,600 + 0.09 × (TI-80,000) |
| 90,000 or More | | 4,500 | 9.4% | 90,000 | 4,500 + 0.094 × (TI-90,000) |

The nice taxable income ranges could be simplified into one range of 0-90,000 or 0-100,000 (100,000 is easier to be recognized than 90,000). Also the nice tax computations are simplified into one computation. Table 8 shows the LG tax system for Alaska corporations with related tax rate range check. The range check is used as a tool to reduce calculation mistakes. Table 9 shows tax rate differences from existing Alaska corporate tax system and the LG tax system for Alaska corporations. Their tax rate differences are very minor. So the LG tax system has significant benefits for simplifying existing Alaska corporate tax system and reducing tax processing time and costs.

TABLE 8

LG Tax System for Alaska Corporations with Range Check

| Filing | Taxable income (TI) | | TI | LG tax rate formula | Tax rate | (Range check) | Tax |
|---|---|---|---|---|---|---|---|
| | Over | Not over | | | | | |
| (AK/1) | 0 | 100,000 | | 0.006 + TI * F/2,066,116 | | (0.006-0.0544) | |
| (AK/2) | 100,000 | | | 0.094-3,960/TI * F | | (0.0544-0.094) | |

TABLE 9

Comparison of Tax Rates between Alaska and LG Tax Systems

| Taxable Income ($) | Alaska tax rate (Tax/TI, Table 7) | LG tax rate (Table 8) | Difference |
|---|---|---|---|
| 5,000 | 1% | 0.84% | -0.2% |
| 10,000 | 1% | 1.08% | 0.0% |
| 15,000 | 1.33% | 1.33% | 0.0% |
| 20,000 | 1.50% | 1.57% | 0.1% |
| 30,000 | 2.00% | 2.05% | 0.1% |
| 40,000 | 2.50% | 2.50% | 0.0% |
| 50,000 | 3.00% | 3.02% | 0.0% |
| 60,000 | 3.50% | 3.50% | 0.0% |
| 70,000 | 4.00% | 3.99% | 0.0% |
| 80,000 | 4.50% | 4.47% | 0.0% |
| 90,000 | 5.00% | 4.96% | 0.0% |
| 100,000 | 5.44% | 5.44% | 0.0% |
| 1,000,000 | 9.00% | 9.00% | 0.0% |
| 20,000,000 | 9.38% | 9.38% | 0.0% |

From Table 8, total tax can be calculated from taxable income data. Tax projection can be done according to prior taxable income data. Tax reform can be done by modifying tax rate formulas for tax changes. Total tax is a simple function of $\Sigma TI$ and $\Sigma TI^2$. Average tax rate is Total Tax divides total taxable incomes ($\Sigma TI$).

$$\text{Total Tax} = 0.006 \Sigma TIm + \Sigma(TI^2)m/2,066,116 + 0.094 \Sigma TI1 - 3,960 \times l = \text{function}(TI)$$

Here l and m are corporation numbers during the two taxable income ranges. The total tax equation or similar equations may be used to do total tax or rate calculation, projection and analysis. Tax rate or tax is a simple function of TI. Also TI may be converted into a function of tax rate (or tax). During a recession, booming economy or special situation, LG tax rates may be reduced for more job openings and business opportunities to promote economic growth or increased for collecting more tax. One easy way is to subtract such as −0.5% or add such as +0.3% to LG tax rate formulas directly. Another way is to adjust related tax rate slope.

Initial federal or state tax rates and/or taxes are calculated. An overall final tax rate relates to accurate employee information. In Example 2, the initial federal tax rate of the married man with two children is 13.96%, which is adjusted to an overall final tax rate of 14.26% with slight difference. His California income tax rate is initially at 3.13%, which is adjusted to an overall final tax rate of 3.24% with slight difference. His family with a one-source income has accurate income tax payments of $8,055.64 to the IRS and $1,590.73 to the State of California. His withholding taxes and payroll payments are shown in Example 2. When his family files their tax return, income tax payments are the same as $8,055.64 to the IRS and $1,590.73 to the state. So his family can have the option to not file tax return for that year.

When taxpayers have a one-source income and non-complex tax situations, they have the option to not file their tax returns and let federal and state governments to know. It can save significant time and costs for taxpayers, federal and state governments, which may be worth billions of dollars yearly. When taxpayers have two or more income sources or complex tax situations such as an annual income more than $120,000, interest more than $1,000, capital gain more than $1,000, federal tax difference more than $200 or state tax difference more than $100, they need to file income tax returns for accurate tax payments. According to the IRS, the average federal taxpayer burden for individuals by activity is about $200. There are about 79 million federal tax returns for about 300 million people in the U.S., which means total taxpayer burdens are about $15,800 million (200×79 million).

There are five processors in the tax payment system. The first processor is to receive employee information of name, social security number, address, tax filing status, social security wage (or income), exemptions, deductions and credits. The second processor is to figure out income tax rates and taxes with related LG formula according to related taxable incomes, federal/state governmental tax regulations, payroll period factor and adjustments. The third processor is to transfer payroll payments from employers to employees at a payroll period of time and paying accurate payroll payments with yearly accurate employee information. The forth processor is to transfer withholding tax payments from taxpayers to governments at a payroll period of time and paying accurate withholding tax payments with yearly accurate employee information. The fifth processor is to transfer yearly employee information and tax payments to the IRS by January 15, which can be adjusted with accurate employee and income tax information by February 15 or March 15 and let governments to know tax return option. One or more processors can be used separately or together. A related website or websites may be built up, which are available for governments, employers and employees to file separately and/or combine together.

For the second processor, an income is inputted at a payroll period basis. After deducting related deductions such as exemptions, standard deductions, health savings, retirements and others from the income into its taxable income, a related tax rate formula from the LG tax rate formulas is chosen. Then tax rate and tax are calculated by a tax product automatically or manually. Calculated tax rate may be compared with its tax rate range check to reduce or avoid calculation mistakes. Income withholding tax is to deduct tax credits from its calculated tax. Federal withholding tax payments are income withholding tax plus social security and Medicare taxes from both employees and employers. Tax rates at different periods of time may be slightly different, which are calculated by the tax product automatically. Income withholding tax is adjusted with related credits such as child tax credit and self-employed credit. A tax rate by the end of a year represents overall final tax rate in that year. Total tax is based on total taxable income and overall final tax rate. Besides federal withholding tax payments, employers also transfer state withholding tax payments to state governments.

Accurate withholding tax payment transactions from taxpayers to governments and payroll payment transactions from employers to employees are done with accurate employee information such as name, social security number, address, tax filing status, social security wage, exemptions, deductions and credits. The last withholding tax payment transaction for a certain prior year is usually done by January 15. Adjustments may be done by February 15 by taxpayers or through their employers. Then the IRS can have the employee information and tax payments ready before receiving tax returns by April 15 to verify or inspect tax returns before sending out tax refunds. For a large refund such as more than $2,000, a tax inspection may be required to avoid a potential tax mistake or crime. Employee information could be adjusted with supported documents by employees with permitted user names and passwords from the IRS, employers or payroll service companies by February 15 or March 15 through a related website or transaction, which is used to replace Form W-2 information. So potential tax theft crimes could be reduced significantly or avoided. Tax theft crimes cost federal and state governments billions of dollars every year.

When the linear and gradual tax system or method is used to simplify and replace current Tax Rate Schedules, Tax Brackets, Tax Tables and Tax Computation Worksheets in the U.S. federal and state tax systems, employers, employees and governments can use the same LG tax rate system with the identical or almost identical tax rates. It combines current two sets of tax systems to estimate withholding taxes with Tax Rate Schedules or Tax Brackets at first and then correct tax estimations with Tax Tables and Tax Computation Worksheets for tax returns into one set of LG tax system, which reduces tax processing time and costs. Also, tax data analysis such as total tax projection may become a simple function of taxable income, which is much easy to be done than current federal and state tax systems with multi tax brackets and Tax Tables. For such as individual Single group (2014), total tax projection can be done with the following equation from the $\Sigma TI$ and $\Sigma TI^2$ in 2013. Here o, p, q and r are related taxpayer numbers in the four taxable income ranges.

$$\text{Total Tax}=0.1\Sigma TIo+\Sigma(TI^2)o/791139.2+0.1621\Sigma TIp+\Sigma(TI^2)p/2293578+0.3299\Sigma TIq-16120*q+0.396\Sigma TIr-42560*r=\text{function}(TI)$$

DETAIL DESCRIPTION OF THE PREFERRED EMBODIMENTS

The following examples set forth preferred methods in accordance with the invention. It is to be understood, however, that these examples are provided by way of illustration and nothing therein should be taken as a limitation upon the overall scope of the invention.

Example 1

When a single man has a one-source income of $31.5/hour, his first bi-weekly working time is 79.5 hours. The federal standard deductions for his tax situation are $6100 for Single and $3900 for each personal exemption. His 401 K retirement at $100/bi-weekly is another deduction. His information is inputted into a processor. His first social security wage on bi-weekly basis is $2,504.25 and annual gross wage estimation is $65,110.50 ($2504.25*26). After an automatic process, his initial federal income tax rate at 16.72% and tax (bi-weekly) at $354.43 are shown. His first payroll payment is $1,958.24 for the first payment period after deducting income withholding tax, social security and Medicare withholding taxes and related deductions. The total withholding taxes from the first bi-weekly payment to the IRS at $737.58 are shown. So $1,958.24 as his first payroll payment is transferred from his employer to his bank account and $737.58 as the first withholding taxes is transferred to the federal government.

By the end of June, if his total working time is 1,050.5 hours, then his annual wage estimation is shown as $66,150.00 with related tax rate at 16.85% during the first six months, which is slightly higher than 16.72% (for the first two weeks). By the end of the year, if his total working time is 2,080.25 hours and he receives a $1,500 bonus in December, his wage is $67,027.88. His total income withholding tax is $9,234.65 at his overall final tax rate of 16.97%. The processing product shows automatically his total payroll payment is $52,472.48 yearly. Total withholding tax, which includes income withholding taxes, social security and Medicare taxes from both the employee and employer to the IRS is $19,464.31. So $52,472.48 as his yearly total payroll payment is transferred from his employer to his bank account and $19,464.31 as the total withholding taxes is transferred to the federal government yearly.

When the single man has no other income besides his above income and bank saving interest of $198.65 and if the interest is not considered his income, he would have an option to not file his federal tax return because the IRS already has his tax records for his income withholding taxes of $9,234.65 and total withholding taxes of $19,464.31. If he files his tax return, his tax would be identical to his income withholding tax of $9,234.65.

When many employees, who meet certain qualifications, like having a one-source income, annual income not more than $120,000, interest not more than $1,000, capital gain not more than $1,000 and provide accurate tax information, have the option to not file their tax returns. Then tax processing time and costs to federal/state governments and taxpayers could be reduced significantly. If 30% of federal tax returns are reduced, then the federal taxpayer burden for individuals of $4.7 (15.8×30%) billions could be saved.

Example 2

A man files as Married Filing Jointly with two children works and lives in California and has a one-source annual based wage of $95,000 from his company. His wife is a homemaker. His federal standard deductions are $12,400 for Married Filing Jointly, $3,950 for each personal exemption and $1,000 for each child credit. He has state standard deductions of $7,812 and exemption credit of $212 for Married Filing Jointly and dependent exemption credit of $326. His retirement is at $146.15/bi-weeks and medical insurance is at $153.85/bi-weeks.

After inputting above employee information, his initial federal income tax rate of 13.96% and income tax (bi-weekly) of $278.30 are shown automatically. His withholding taxes (bi-weekly), which include income withholding tax, social security and Medicare taxes from both him and his employer, are $837.34 to the federal government. His initial California income tax rate of 3.13% and income tax (bi-weekly) of $53.59 to his state are shown. His initial payroll (bi-weekly) is $3,042.44. So $3,042.44 as his first payroll payment is transferred from his employer to his bank account. $837.34 as the first withholding taxes is transferred to the federal government and $53.59 as his state income tax is transferred to the state government.

By the end of the year, if he receives a bonus of $4,500, which needs to be adjusted, his yearly overall final federal income tax rate is at 14.26%, which is slightly increased from 13.96%. His total withholding taxes, which include total income withholding tax, social security and Medicare taxes from both employee and his employer, are $23,279.14. His total federal income tax is $8,055.64. His yearly overall final California income tax rate is at 3.24%%, which is slightly increased from 3.13%. His total state taxes are $1,590.73. His last bi-weekly payroll is $6,180.84 in December. His yearly total social security wage is $99,500. His yearly total federal taxable income is $63,500. His yearly total payroll is $82,241.88. The processing product shows these above numbers automatically. So $82,241.88 as his yearly total payroll payment is transferred from his employer to his bank account. $23,279.14 as the total withholding taxes is transferred to the federal government and $1,590.73 as his total state income tax is transferred to his state.

The IRS can have his information and tax records of income withholding taxes of $8,055.64 and the State of California can have his information and state tax records of $1,590.73 by January 15. If the family has no other income besides his wage and their bank saving interest of $225.87, which is not considered a taxable income, and uses the above federal and state deductions and tax credits, the family has income taxes of $8,055.64 and $1,590.73 respectively when the family files their federal and state tax returns. Then the family may have an option to not file their federal and state tax returns.

If the above bank saving interest of $225.87 is added into their income, then the family needs to pay a total federal income tax of $8,097.51 with the difference of $41.87 and total state tax of $1,600.82 with the difference of $10.09, which are shown by the processing product automatically. Total extra federal and state taxes are only $51.96 (=41.87+10.09). It is not worth to file their federal and state tax returns by paying the extra $41.87 to the federal government and $10.09 to their state government, which involves more tax processing costs and time to the taxpayer and their governments.

Governments may offer many taxpayers, who meet certain qualifications, have the option to not file tax returns. Then tax processing time and costs to federal/state governments and taxpayers could be reduced significantly. If federal tax difference between income withholding tax and calculated tax in the federal tax return is not more than $200 or a state tax difference between income withholding tax and calculated tax in a state tax return is not more than $100, it may be suggested to offer these taxpayers an option to not file their federal or state tax returns to save tax processing time and costs to taxpayers and governments. Taxpayers with two or more incomes, annual income more than $120,000, interest more than $1,000 and capital gain more than $1,000 have to file tax returns. The employee information with withholding tax payments can be reported to the IRS by January 15 or adjusted by February 15 or March 15, which helps the IRS and state governments to verify and/or inspect tax returns before sending out tax refunds after receiving tax returns. So potential tax theft crimes could be reduced significantly or avoided to save billions of dollars yearly for federal and state governments.

What is claimed is:

1. A method for making individual income tax payments through a computational hardware processor comprising:
   receiving, using said computational hardware processor, taxation data for a plurality of employees from a plurality of employers, said taxation data including at least a payroll period factor (F), a tax filing status, and an income of each of said plurality of employees;
   converting, using said computational hardware processor, said taxation data of said plurality of employees into a common format;
   using said taxation data to determine, via said computational hardware processor, a taxable income (TI) of each of said plurality of employees;
   using said computational hardware processor to apply to said taxable income of each of said plurality of employees one of a linear procedure and a gradual procedure to determine a tax rate (Y) and a tax for each of said plurality of employees;
   using said computational hardware processor to automatically select a tax bracket for each of said plurality of employees based on their respective taxable incomes, said tax bracket being selected from a group of tax brackets consisting of two to four tax brackets;
   using said computational hardware processor to evaluate said tax of each of said plurality of employees to determine each of a payroll payment and an income withholding tax payment for each of said plurality of employees;
   using said computational hardware processor to determine a tax balance for each of said plurality of employees based on said income withholding tax payment and said tax of each of said plurality of employees;
   transferring said income withholding tax payment from each of said plurality of employees to a government on a payroll schedule associated with said plurality of employees;
   wherein:
   application of said linear procedure by said computational hardware processor includes determining $Y=a+TI*F/b$, where a and b are constants; and
   application of said gradual procedure by said computational hardware processor includes determining $Y=c-d/(TI*F)$, where c and d are constants.

* * * * *